UNITED STATES PATENT OFFICE.

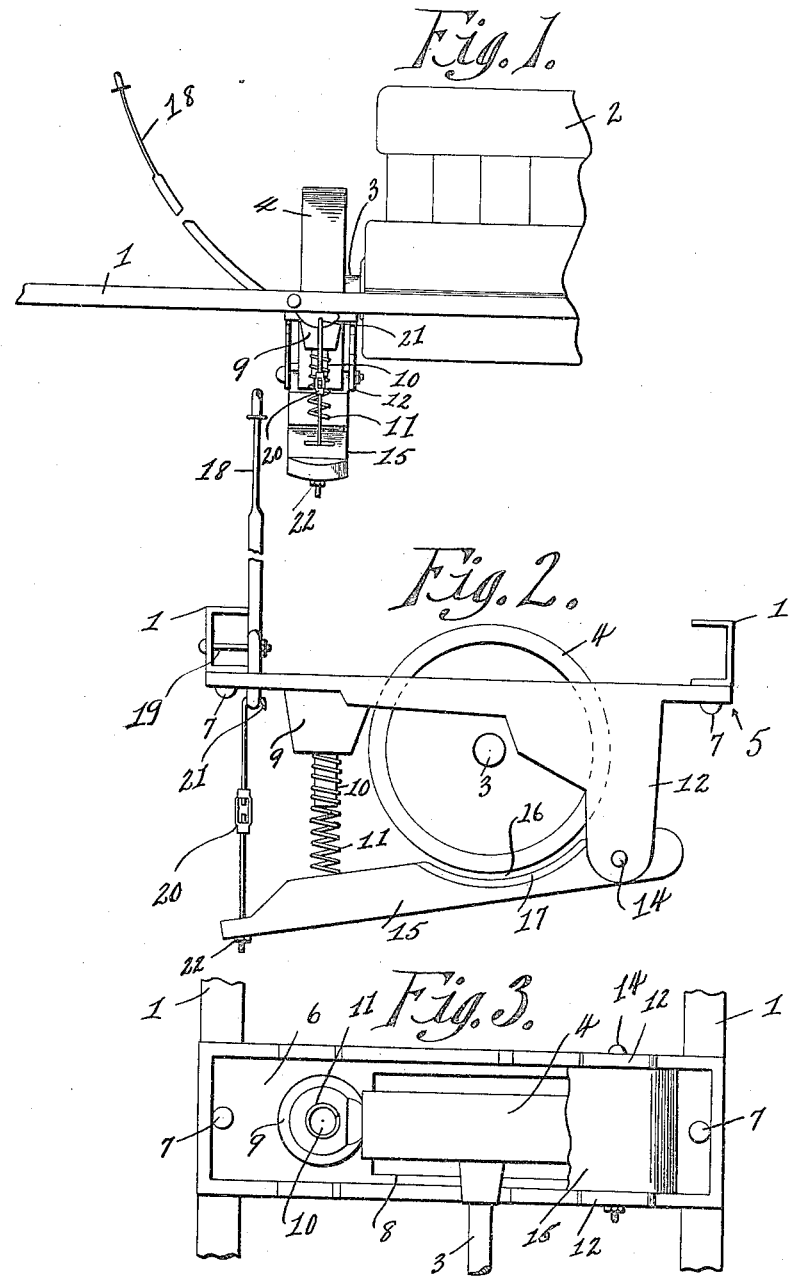

GEORGE W. HARRIS, OF BRUSHTON, NEW YORK.

FLY-WHEEL BRAKE.

1,231,601.  Specification of Letters Patent.  Patented July 3, 1917.

Application filed January 6, 1917.  Serial No. 140,967.

*To all whom it may concern:*

Be it known that I, GEORGE W. HARRIS, a citizen of the United States, residing at Brushton, in the county of Franklin and State of New York, have invented a new and useful Fly-Wheel Brake, of which the following is a specification.

By way of explanation it may be stated that in cases of emergency, when the brakes are applied to the rear wheels of a motor propelled vehicle, the brakes frequently do not take hold at the same time. As a consequence, the rear end of the vehicle skids, and in many cases, the vehicle turns turtle.

The present invention aims to overcome difficulties of the kind above mentioned, by applying a brake to the fly wheel of the engine of the vehicle, and by providing novel means for mounting the brake and for controlling the brake.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a motor-propelled vehicle to which the device forming the subject matter of this application has been attached;

Fig. 2 is a cross section showing a part of a motor-propelled vehicle equipped with the device forming the subject matter of this application; and Fig. 3 is a bottom plan showing a portion of a vehicle equipped with the brake herein disclosed, parts being broken away.

The numeral 1 denotes the constituent bars of the chassis of a motor propelled vehicle, the chassis 1 supporting an internal combustion engine 2 the shaft of which is denoted by the numeral 3, the shaft 3 carrying a fly wheel 4.

Disposed transversely of the chassis 1 is a bracket denoted generally by the numeral 5 and including a top plate 6 secured as shown at 7 to the bars of the chassis 1. The top plate 6 has an opening 8 through which the fly wheel 4 projects. Adjacent one end, the top plate 6 of the bracket 5 is supplied with a depending boss 9 carrying a stud 10 to which is attached a helical compression spring 11 abutting at its inner end against the boss 9. The top plate 6 of the bracket 5 is equipped with depending ears 12 carrying a pivot element 14 on which one end of a lever 15 is mounted to swing vertically. The lever 15 has a concaved seat 16 provided with a friction facing 17 coöperating with the periphery of the fly wheel 4. The numeral 18 denotes a lever fulcrumed at 19 on one of the bars of the chassis 1 to swing in a vertical plane. The numeral 20 denotes an adjustable connection preferably in the form of a turnbuckle, one end of the connection 20 being pivoted at 21 to the lever 18, and the other end of the connection being pivoted at 22 to the free end of the lever 15.

In order to bring the car to a quick stop, the switch of the ignition circuit is opened, and the supply of gasolene is shut off. The motor may be permitted to remain in high gear, and when the lever 18 is operated, the connection 20 will swing the lever 15 upwardly on its fulcrum 14, the lever coöperating with the fly wheel 4 to effect a braking action. When the lever 15 moves upwardly, the spring 11 is put under compression, and when the lever 18 is released, the spring 11 will serve to space the lever 15 from the periphery of the fly wheel 4, so that the fly wheel can rotate freely. The turnbuckle connection may be adjusted to the desired length, so that the lever 15 will coact with the fly wheel 4 when the member 18 is swung on its fulcrum 19.

Having thus described the invention, what is claimed is:—

In a device of the class described, spaced supporting bars; a bracket disposed transversely of the bars and terminally secured to the bars, the bracket being provided adjacent one end with a depending ear; a brake lever disposed below the bracket and below the bars and extended transversely of the bars; means on the upper edge of the brake lever for engaging directly with a rotating element, the bracket being provided in its top with an opening disposed directly above said means and adapted to receive a rotating element; a pivot element connecting one end of the lever with the ear; an operating lever; a longitudinally extensible connection uniting the operating lever with the other end of the brake lever; and a compression spring interposed between the bracket and the brake lever, the spring constituting means for swinging the brake lever downwardly and for spacing the brake lever from a rotating element.

In testimony that I claim the foregoing as my own, I have hereto affixed my signature in the presence of two witnesses.

GEORGE W. HARRIS.

Witnesses:
F. D. WOODS,
H. S. ORTON.

Copies of this patent may be obtained for five cents each, by addressing the "Commissioner of Patents, Washington, D. C."